United States Patent
Deluca et al.

(10) Patent No.: US 11,151,587 B2
(45) Date of Patent: *Oct. 19, 2021

(54) INTELLIGENT MARKETING USING GROUP PRESENCE

(71) Applicant: INTERNATIONAL BUSINESS MACHINES CORPORATION, Armonk, NY (US)

(72) Inventors: Lisa Seacat Deluca, Baltimore, MD (US); Steve Mcduff, Markham (CA)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/861,193

(22) Filed: Apr. 28, 2020

(65) Prior Publication Data

US 2020/0258101 A1    Aug. 13, 2020

Related U.S. Application Data

(63) Continuation of application No. 15/299,528, filed on Oct. 21, 2016, now Pat. No. 10,664,852.

(51) Int. Cl.
*G06Q 30/02* (2012.01)
*H04L 29/08* (2006.01)

(52) U.S. Cl.
CPC ..... *G06Q 30/0201* (2013.01); *G06Q 30/0207* (2013.01); *H04L 67/18* (2013.01); *G06Q 30/0252* (2013.01)

(58) Field of Classification Search
CPC ........... G06Q 30/0201; G06Q 30/0207; G06Q 30/0202; G06Q 30/0252; G06Q 30/0261; G06Q 50/01; H04L 67/18
See application file for complete search history.

(56) References Cited

U.S. PATENT DOCUMENTS

| 7,962,361 | B2  | 6/2011 | Ramchandani et al. |
| 8,229,458 | B2  | 7/2012 | Busch |
| 8,229,470 | B1* | 7/2012 | Ranjan ............ H04W 4/022 |
|           |     |        | 455/456.3 |

(Continued)

FOREIGN PATENT DOCUMENTS

| CA | 2857371 A1 | 6/2013 |
| WO | WO 2015085967 A1 | 6/2015 |

OTHER PUBLICATIONS

Mell, Peter, et al., "The NIST Definition of Cloud Computing", NIST Special Publication 800-145, Sep. 2011, Gaithersburg, MD, 7 pgs.

(Continued)

*Primary Examiner* — Matthew S Gart
*Assistant Examiner* — Stephen S Swartz
(74) *Attorney, Agent, or Firm* — Stephanie Carusillo; George S. Blasiak; Heslin Rothenberg Farley & Mesiti PC

(57) ABSTRACT

Methods, computer program products, and systems are presented. The methods include, for instance: automatically selecting an optimal marketing collateral for a location in a venue based on a group of a patron and a relationship of the group and notifying the patron with the optimal marketing collateral such that the patron may utilize the optimal marketing collateral.

20 Claims, 8 Drawing Sheets

(56) References Cited

U.S. PATENT DOCUMENTS

| | | | |
|---|---|---|---|
| 8,341,029 B1* | 12/2012 | Ramalingam | G06Q 20/202 705/26.1 |
| 8,385,943 B1* | 2/2013 | Han | H04W 4/33 455/456.1 |
| 8,538,458 B2* | 9/2013 | Haney | H04L 67/42 455/456.2 |
| 2004/0198386 A1* | 10/2004 | Dupray | H04W 64/00 455/456.1 |
| 2007/0117623 A1 | 5/2007 | Nelson et al. | |
| 2007/0287473 A1* | 12/2007 | Dupray | H04W 4/029 455/456.1 |
| 2008/0306826 A1* | 12/2008 | Kramer | G06Q 30/0212 705/14.14 |
| 2009/0030778 A1* | 1/2009 | Zapata | G06Q 30/0205 705/7.34 |
| 2009/0215469 A1* | 8/2009 | Fisher | H04W 4/029 455/456.3 |
| 2010/0250351 A1* | 9/2010 | Gillenson | G06Q 30/0216 705/14.13 |
| 2010/0262464 A1* | 10/2010 | Monteforte | G06Q 10/00 705/7.29 |
| 2011/0161419 A1 | 6/2011 | Chunilal et al. | |
| 2011/0205068 A1 | 8/2011 | Huynh et al. | |
| 2012/0116876 A1 | 5/2012 | Graham et al. | |
| 2013/0073336 A1* | 3/2013 | Heath | G06Q 30/02 705/7.29 |
| 2013/0073387 A1 | 3/2013 | Heath | |
| 2014/0006129 A1 | 1/2014 | Heath | |
| 2014/0156396 A1 | 6/2014 | deKozan et al. | |
| 2014/0257953 A1* | 9/2014 | Kaplan | G06Q 30/0214 705/14.16 |
| 2014/0337123 A1 | 11/2014 | Nuernberg et al. | |
| 2015/0057012 A1 | 2/2015 | Hong et al. | |
| 2015/0119070 A1 | 4/2015 | Harris et al. | |
| 2015/0120502 A1 | 4/2015 | Jung et al. | |
| 2015/0242888 A1 | 8/2015 | Zises | |
| 2015/0370814 A1 | 12/2015 | Liodden et al. | |
| 2017/0132648 A1 | 5/2017 | Deluca et al. | |
| 2017/0235848 A1* | 8/2017 | Van Dusen | G06F 16/904 705/12 |
| 2018/0192244 A1 | 7/2018 | Deluca et al. | |

OTHER PUBLICATIONS

Soltani, Ashkan, et al., "New documents show how the NSA infers relationships based on mobile location data", [retrieved on Sep. 8, 2016]. Retrieved from the Internet <URL: http://www.washingtonpost.com/blogs/the-switch/wp/2013/12/10/new-documents-show-how-the-nsa-infers-relationships-based-on-mobile-location-data/>, Dec. 10, 2013, 6 pgs.

Non-Final Rejection for U.S. Appl. No. 15/299,528, dated Jan. 25, 2017.

Response to Non-Final Rejection for U.S. Appl. No. 15/229,528, filed Apr. 25, 2017.

Final Rejection for U.S. Appl. No. 15/229,528, dated Jul. 6, 2017.

Response to Final Rejection for U.S. Appl. No. 15/229,528, filed Sep. 6, 2017.

Advisory Action for U.S. Appl. No. 15/229,528, dated Oct. 5, 2017.

Response to Advisory Action for U.S. Appl. No. 15/229,528, filed Dec. 5, 2017.

Non-Final Rejection for U.S. Appl. No. 15/229,528, dated Feb. 22, 2018.

Response to Non-Final Rejection for U.S. Appl. No. 15/229,528, filed May 31, 2018.

Final Rejection for U.S. Appl. No. 15/229,528, dated Aug. 24, 2018.

Response to Final Rejection for U.S. Appl. No. 15/229,528, filed Dec. 26, 2018.

Non-Final Rejection for U.S. Appl. No. 15/229,528, dated Mar. 5, 2019.

Response to Non-Final Rejection for U.S. Appl. No. 15/229,528, filed Nov. 22, 2019.

Notice of Allowance for U.S. Appl. No. 15/229,528, dated Jan. 14, 2020.

List of IBM Patent and/or Patent Applications treated as related for U.S. Appl. No. 16/861,193, filed Apr. 28, 2020, dated Aug. 7, 2020.

* cited by examiner

INTELLIGENT MARKETING USING GROUP PRESENCE

CROSS-REFERENCE TO RELATED APPLICATION

This application is a continuation of U.S. patent application Ser. No. 15/299,528, filed Oct. 21, 2016, entitled, "Intelligent Marketing Using Group Presence", the entirety of which is hereby incorporated herein by reference.

TECHNICAL FIELD

The present disclosure relates to automated marketing campaign, and more particularly to methods, computer program products, and systems for notifying patrons with product marketing information as intelligently selected based on company of the patrons.

BACKGROUND

Conventionally, in-store marketing campaigns indiscriminately provide various marketing information to patrons in a store. Marketing efforts for specific products are often exercised in the vicinity of the specific products to promote sales by informing the patrons with various promotions in which the patrons may be interested, such as special discounts and bundle offers of the specific products.

SUMMARY

The shortcomings of the prior art are overcome, and additional advantages are provided, through the provision, in one aspect, of a method. The method for intelligent marketing includes, for example: detecting, by one or more processor, a location event for a location within a venue as generated by a patron; determining a group of the patron and a relationship of the group; selecting an optimal marketing collateral for the patron based on the group and the relationship from the determining; and communicating the optimal marketing collateral from the selecting to the patron such that the patron may utilize the optimal marketing collateral.

Additional features are realized through the techniques set forth herein. Other embodiments and aspects, including but not limited to computer program product and system, are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1:
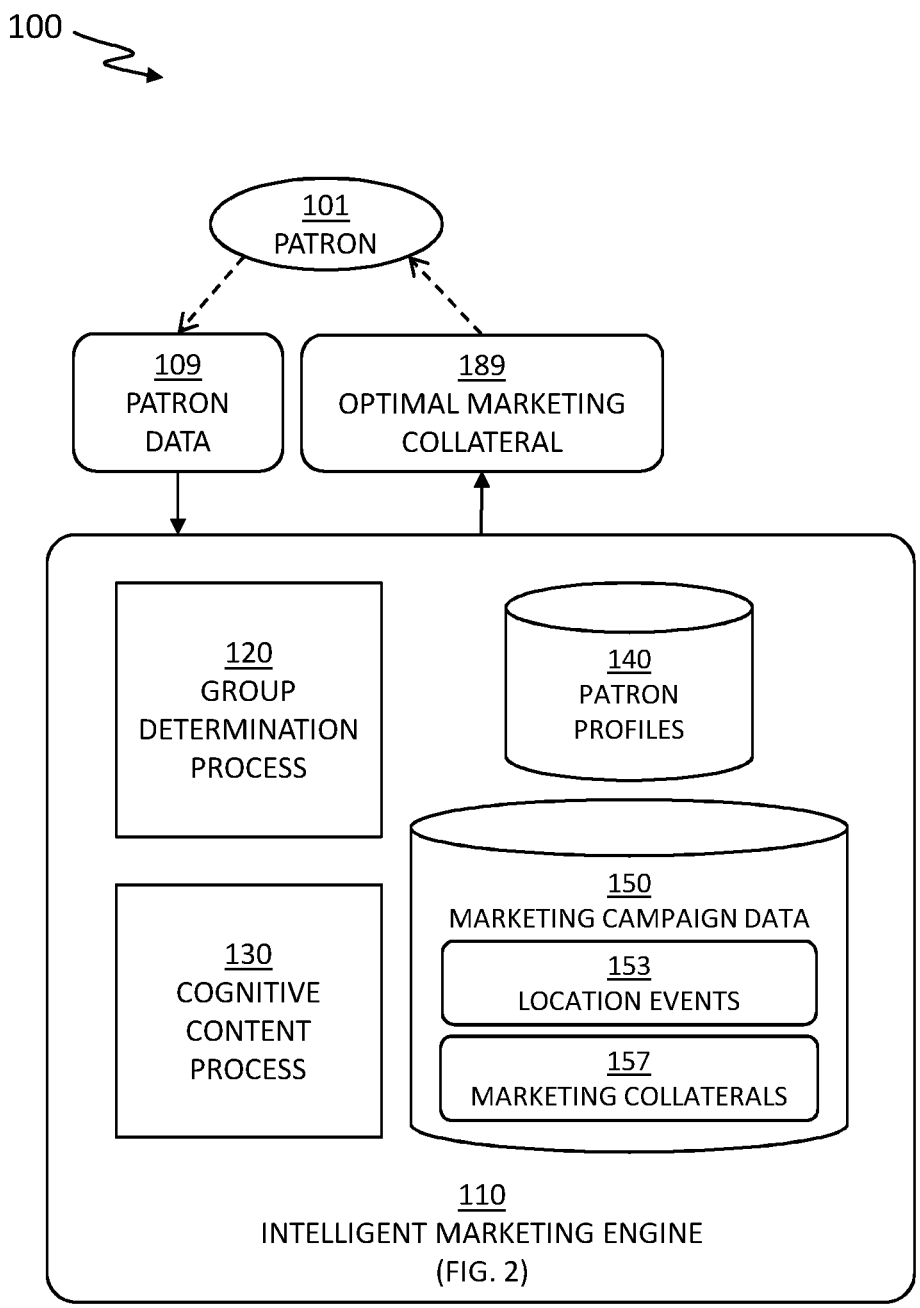
FIG. 1 depicts a system 100 for intelligent marketing based on group presence, in accordance with one or more embodiments set forth herein.

FIG. 1 depicts a system 100 for intelligent marketing based on group presence, in accordance with one or more embodiments set forth herein.

The system 100 includes an intelligent marking engine 110, which receives patron data 109 originated from a patron amongst one or more patron 101 and sends an optimal marketing collateral 189 to the patron 101 in a venue. In one embodiment of the present invention, the venue may be a retail store. The intelligent marketing engine 110 selects the optimal marketing collateral 189 from marketing collaterals 157 of marketing campaign data 150, based on an observation that when the patron 101 is in a group, the patron 101 may behave differently in making purchase decisions for certain products according to whether or not the patron 101 is shopping in a group as well as which type of group the patron 101 is presently shopping with, etc. For example, the patron 101 may be expected to purchase a respectively distinctive product from a frozen food section of the store when the patron 101 is shopping without a company, with one or more family member, with one or more friend, social acquaintance, or colleague. In one embodiment of the present invention, the optimal marketing collateral 189 may be a pushed notification on a mobile device of the patron 101. By delivering the optimal marketing collateral 189 of a product that the patron 101 is most likely to purchase in a certain section of the store based on analyzing group presence and group dynamics of the patron 101 as noted, the intelligent marketing engine 110 may effectively promote the product without overwhelming the patron 101 with numerous promotional messages or without annoying the patron 101 with a promotional notification on a product with which the patron 101 is uninterested, as in conventional marketing.

The patron data 109 may be generated by use of various monitoring devices in a store, or a generic mobile device on the patron 101 such as a smartphone, etc. Examples of the monitoring devices in the store may include, but are not limited to, devices identifying the patron 101 such as video cameras and image recognition, radio frequency identification (RFID) tags and scanners, and various micro-location devices within the store by use of individual mobile devices on the patron 101 and corresponding data collection systems based on Bluetooth®, Wi-Fi®, near field communication (NFC), etc. (Bluetooth is a registered trademark of Bluetooth Special Interest Group in the United States and other countries; Wi-Fi is a registered trademark of Wi-Fi Alliance in the United States and other countries) Further, data stored in a generic mobile device such as a smartphone on the patron 101 may be utilized to identifying the patron 101 and determining group relations of the patron 101, as consented by the patron 101 beforehand such as signing up for store membership/reward program by downloading mobile app, etc.

The patron data 109 may include location data within the store as set for marketing purposes indicating if the patron 101 enters or exits a specific product section of the store, how long the patron 101 stays in the specific product section of the store, if the patron 101 enters or exits the store premise, how long the patron 101 stays in the store premise, etc. The patron data 109 may further include contact directory data on the smartphone of the patron 101 where the patron had agreed as previously noted, in order to determine the identity and the group relations of the patron 101.

The intelligent marketing engine 110 may include a group determination process 120, a cognitive content process 130, patron profiles 140, and the marketing campaign data 150. The patron profiles 140 store purchase histories of the patron 101 as associated with group information at the time of purchases. The marketing campaign data 150 store location events 153 and marketing collaterals 157 associated with the location events 153. Wherein the patron 101 generates a certain location event in the store, the intelligent marketing engine 110 determines whether or not the patron 101 is in a group and a relation for any existing group, and notifies the patron 101 with the optimal marketing collateral 189, which is selected from the marketing collaterals 157 associated with the location event as most likely for the patron 101 to purchase based on group presence. In another embodiment of the present invention, the intelligent marketing engine 110 examines a purchase history in the patron profiles 140 of the patron 101 in association with a specific group presence and selects the optimal marketing collateral 189 based on the purchase history. In one embodiment of the present invention, the patron profiles 140 and/or the marketing campaign data 150 may be external to the intelligent marketing engine 110 but still communicable via a network connection etc. Detailed operations of the intelligent marketing engine 110 are presented in FIG. 2 and corresponding description.

The group determination process 120 indicates a functional element of the intelligent marketing engine 110 in which the intelligent marketing engine 110 determines whether or not the patron 101 is in a group, and a relationship of the patron 101 to any group that had been determined to be present. Similarly, the cognitive content process 130 indicates another functional element of the intelligent marketing engine 110 in which the intelligent marketing engine 110 associates various selections of the marketing collaterals 157 to different groups based on cognitive analysis of purchase patterns based on respective group purchase histories, weather, a state of mind for the patron, a state of mind for the group, date and time of the day, group dynamics, etc., to maximize sales as promoted by the marketing collaterals 157 and to accurately predict purchase decisions based on aforementioned factors. The intelligent marketing engine 110 performs data mining to further improve marketing efficiency by associating various factors such as group presence with purchase patterns as represented in the patron profiles 140. The intelligent marketing engine 110 performs data mining to improve marketing efficiency by associating purchase patterns as represented in the patron profiles 140 with a group determination as generated by the group determination process 120, cognitive factors subject to analysis by the cognitive content process 130, etc.

Figure 2:
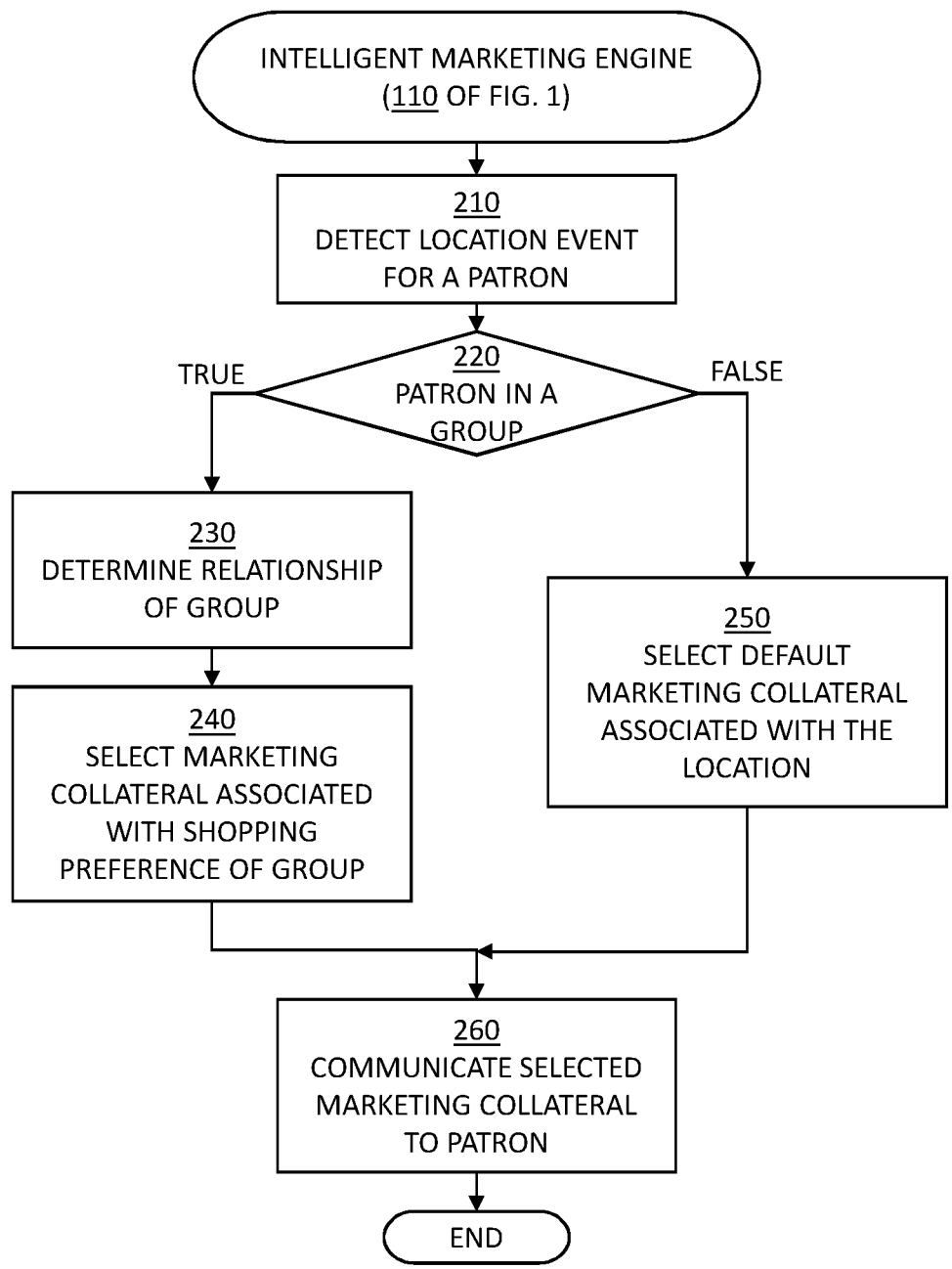
FIG. 2 depicts a flowchart performed by the intelligent marketing engine, in accordance with one or more embodiments set forth herein.

FIG. 2 depicts a flowchart performed by the intelligent marketing engine 110 of FIG. 1, in accordance with one or more embodiments set forth herein.

In block 210, the intelligent marketing engine 110 detects a location event as generated by movements of a patron in and around a store. The location event is configured to correspond to one or more marketing collateral in marketing campaign data. Then the intelligent marketing engine 110 proceeds with block 220.

In one embodiment of the present invention, a site/venue employing the intelligent marketing engine 110 for is a retail store, which has various locations within the retail store referred to as a zone such as a dairy zone, a freezer zone, a produce zone, etc. Examples of the location event may be, but are not limited to, an entry to a zone, an exit from a zone, a duration of stay in a zone, an entry to an outdoor area, an exit from an outdoor area, a duration of stay in an outdoor area, etc. Examples of marketing collaterals may be, but are not limited to, push text messages to a mobile device of the patron and/or email messages to the patron on various in-store promotions such as special discounts, bundled or otherwise incentivized offers, etc.

In block 220, the intelligent marketing engine 110 determines whether or not the patron is with a group. If the intelligent marketing engine 110 determines that the patron is with a group, then the intelligent marketing engine 110 proceeds with block 230. If the intelligent marketing engine 110 determines that the patron is without a group, then the intelligent marketing engine 110 proceeds with block 250.

In one embodiment of the present invention, the intelligent marketing engine 110 determines a group presence based on proximity and/or travel pattern of multiple mobile devices, etc., based on commercially available mobile-device based customer support and service systems.

In block 230, the intelligent marketing engine 110 determines a relationship of the group as discovered in block 220, based on various relationship data. Examples of distinctive group presences are presented in FIGS. 3A, 3B and 3C and corresponding description. Then the intelligent marketing engine 110 proceeds with block 240.

In one embodiment of the present invention, the intelligent marketing engine 110 determines the relationship of the group to the patron based on contact directory data stored in a mobile device of the patron, social network relationships of the patron, and/or other searches based on the contact directory data of the patron, etc. In certain embodiments of the present invention, the group relations are selected from a preconfigured types such as family, friends, coworkers, etc.

In another embodiment of the present invention, the intelligent marketing engine 110 determines the relationship of the group to the patron based on social media relationship and/or interaction data, which directly or indirectly indicate the relationship.

In another embodiment of the present invention, the intelligent marketing engine 110 determines the relationship of the group to the patron based on the patron profiles 140 that is provided to the venue such as a form disclosing certain relationships upon registration.

In block 240, the intelligent marketing engine 110 selects an optimal marketing collateral available for the zone from which the patron generated the location event. The intelligent marketing engine 110 selects the optimal marketing collateral that the patron in the specific group of the relationship as determined in block 230 is most likely to purchase, preconfigured as a respective relationship marketing collateral. Wherein the marketing campaign data does not include a marketing collateral specifically intended for the type of group, the intelligent marketing engine 110 selects a default marketing collateral for the zone. Then the intelligent marketing engine 110 proceeds with block 260.

In one embodiment of the present invention, the intelligent marketing engine 110 may utilize characterization of the group in selecting the optimal marketing collateral for the patron. For example, the intelligent marketing engine 110 notifies a default marketing collateral if the patron is shopping without a group, and a product generally more popular with a type of group if the patron is shopping with a group. In another embodiment of the present invention, the intelligent marketing engine 110 may utilize the cognitive content process 130 which analyzes a group activity pattern by use of machine learning in selecting the optimal marketing collateral such that the intelligent marketing engine 110 selects the optimal marketing collateral based on purchase history/patterns of the patron with the present group, weather, a state of mind for the patron, a state of mind for the group, date and time of the day, group dynamics, etc.

In block 250, the intelligent marketing engine 110 selects a default marketing collateral for the location as the patron is not with a group. Then the intelligent marketing engine 110 proceeds with block 260.

In block 260, the intelligent marketing engine 110 communicates the marketing collateral as selected in previous blocks 240 or 250 to the patron. Examples of optimal marketing collaterals based on distinctive group presences are presented in FIGS. 3A, 3B and 3C and corresponding description. Then the intelligent marketing engine 110 terminates processing the location event.

In one embodiment of the present invention, the intelligent marketing engine 110 may further gather and cumulate purchase history of the patron of a product promoted by the marketing collateral in block 260, and improve effectiveness of future marketing campaigns by use of customized marketing services for respective groups via tools such as the IBM Marketing Cloud.

Figure 3A:
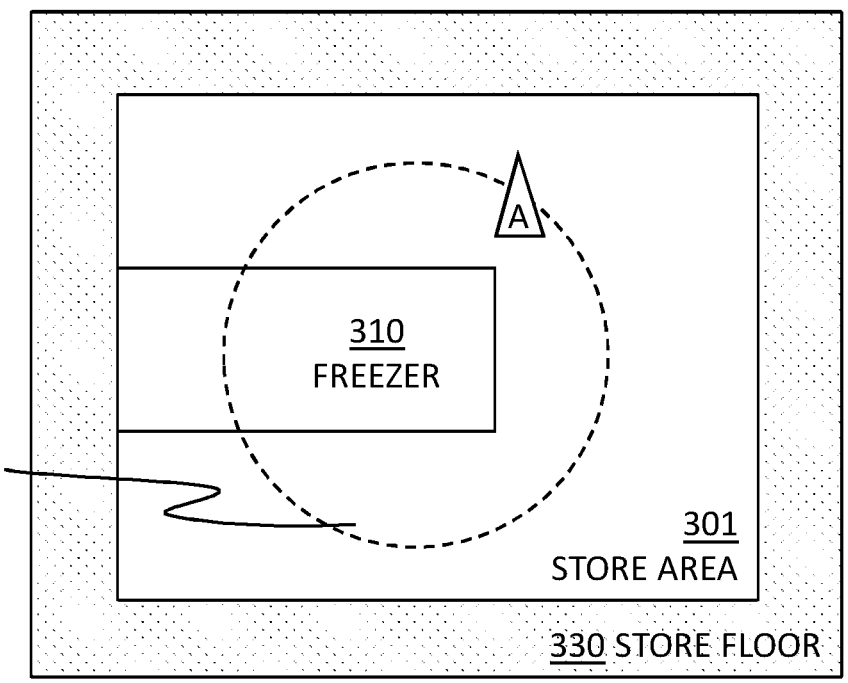
FIGS. 3A, 3B and 3C depict examples of marketing collaterals presented for a patron in various group scenarios, in accordance with one or more embodiments set forth herein.
Figure 3B:
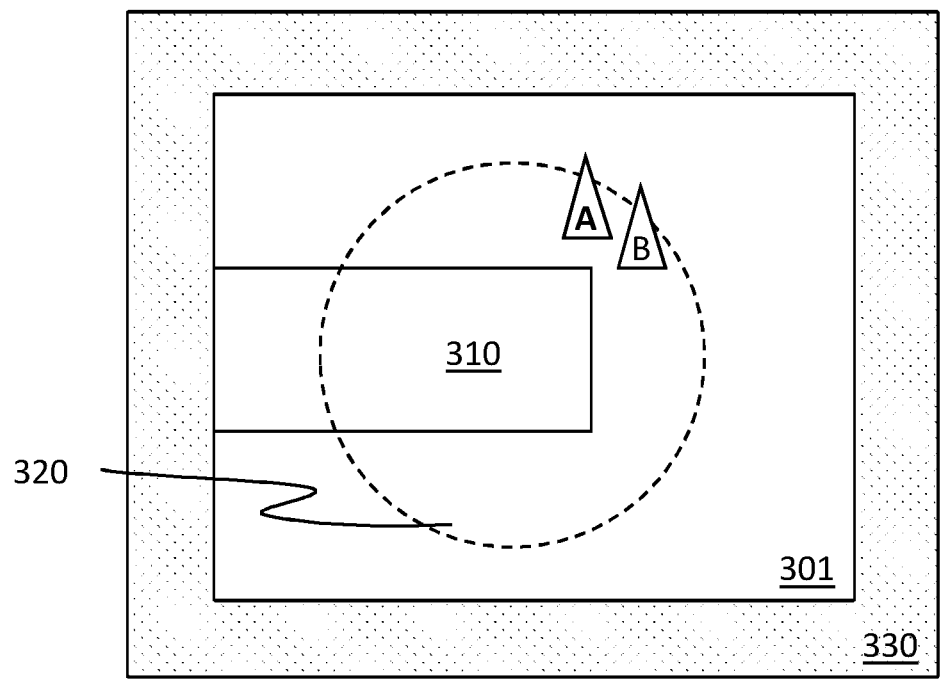
Figure 3B:
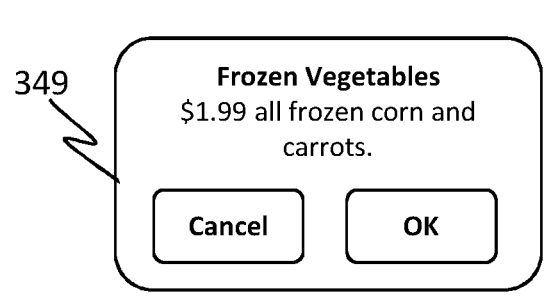
Figure 3C:
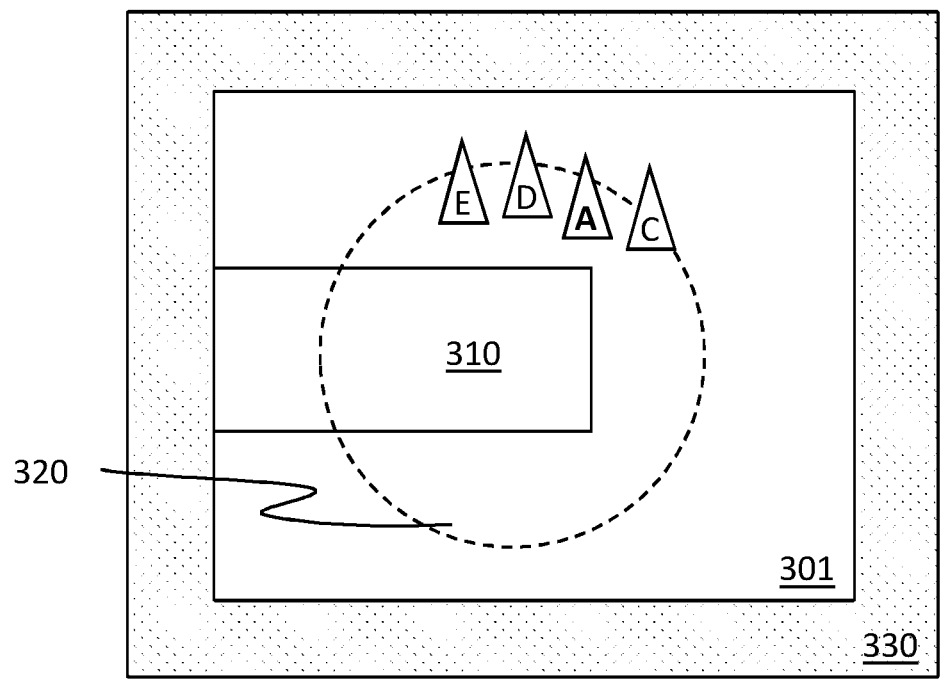
Figure 3C:
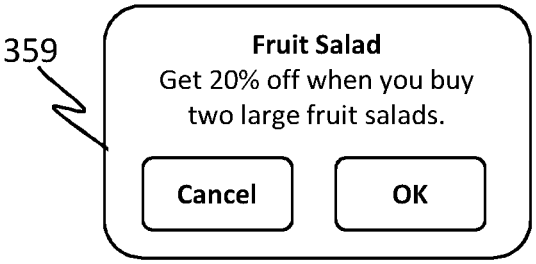

FIGS. 3A, 3B and 3C depict examples of marketing collaterals presented for a patron in various group scenarios, in accordance with one or more embodiments set forth herein.

FIG. 3A depicts a first group scenario 300A, in which a patron A walks into a freezer zone 320 around a freezer 310 of a store area 301 in a store. A store floor 330 indicates the rest of area within the store that also may have other location/zone set up for intelligent marketing. The intelligent marketing engine 110 determines that the patron A is shopping without a company based on that no other person is present within the freezer zone 320. The intelligent marketing engine 110 accordingly selects a default marketing collateral 339 for the freezer zone 320, which is a message promoting ice cream, and sends the default marketing collateral 339 to a mobile device of the patron A. The intelligent marketing engine 110 may further analyze cognitive factors and purchase patterns associated with the patron A as an individual, then select another marketing collateral.

FIG. 3B depicts a second group scenario 300B, in which the patron A and a patron B walk into the freezer zone 320. The intelligent marketing engine 110 determines that the patron A is shopping in a group, and determines that the patron A and the patron B are family, based on contact directory data stored in the mobile device of the patron A. The intelligent marketing engine 110 accordingly selects a family marketing collateral 349 for the freezer zone 320, which is a message promoting frozen vegetables, and sends the family marketing collateral 349 to the mobile device of the patron A. The intelligent marketing engine 110 may further analyze cognitive factors and purchase patterns associated with the patrons A and B as a group, then select another family marketing collateral.

FIG. 3C depicts a third group scenario 300C, in which the patron A, and patrons C, D, and E walk into the freezer zone 320. The intelligent marketing engine 110 determines that the patron A is shopping in a group, and determines that the patrons A, C, D, and E are friends, based on contact directory data stored in the mobile device of the patron A. By default, a marketing collateral for a group of friends may be a frozen pizza. Instead, the intelligent marketing engine 110 further searches for social media postings in which the group of A, C, D, and E participated to determine the optimal marketing collateral for the group. The intelligent marketing engine 110 discovers a social media posting stating that "I ate too much Halloween candy, time to go on a diet!" by the patron C and analyzes the interactions. According to the analysis on the state of mind of the group, the intelligent marketing engine 110 determines that members of the group presently support the weight-loss resolution of the patron C, and selects a weight-loss marketing collateral 359 for the freezer zone 320, which is a message promoting fruit salads, and sends the selected weight-loss marketing collateral 359 to the mobile device of the patron A.

Certain embodiments of the present invention may offer various technical computing advantages, including personalized marketing based on mobile technology, particularly group presence and group relations. Certain embodiments of the present invention implement and utilize data mining relevant to purchase patterns of a patron in a specific types of group such that customized marketing information may be communicated to the patron for maximum efficacy. Certain embodiments of the present invention implement and utilize cognitive analysis of factors influencing purchase behavior or the patron such as group activity pattern, weather, a state of mind for the patron, a state of mind for the group, date and time, etc. such that the marketing effort would be more focused on the individual group characteristics and more suitable for a context of a shopping, in order to achieve maximum utilization of the marketing collaterals, which leads to sales increase.

Figure 4:
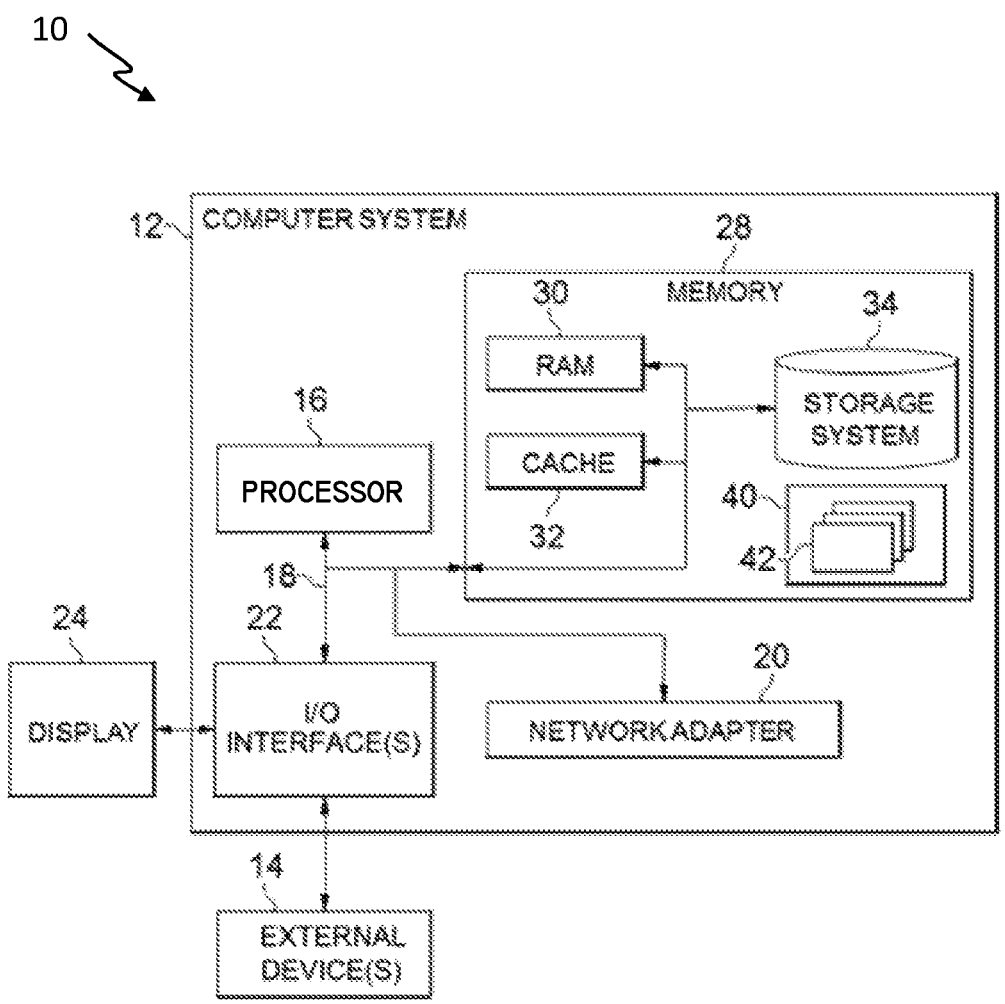
FIG. 4 depicts a cloud computing node according to an embodiment of the present invention.
Figure 5:
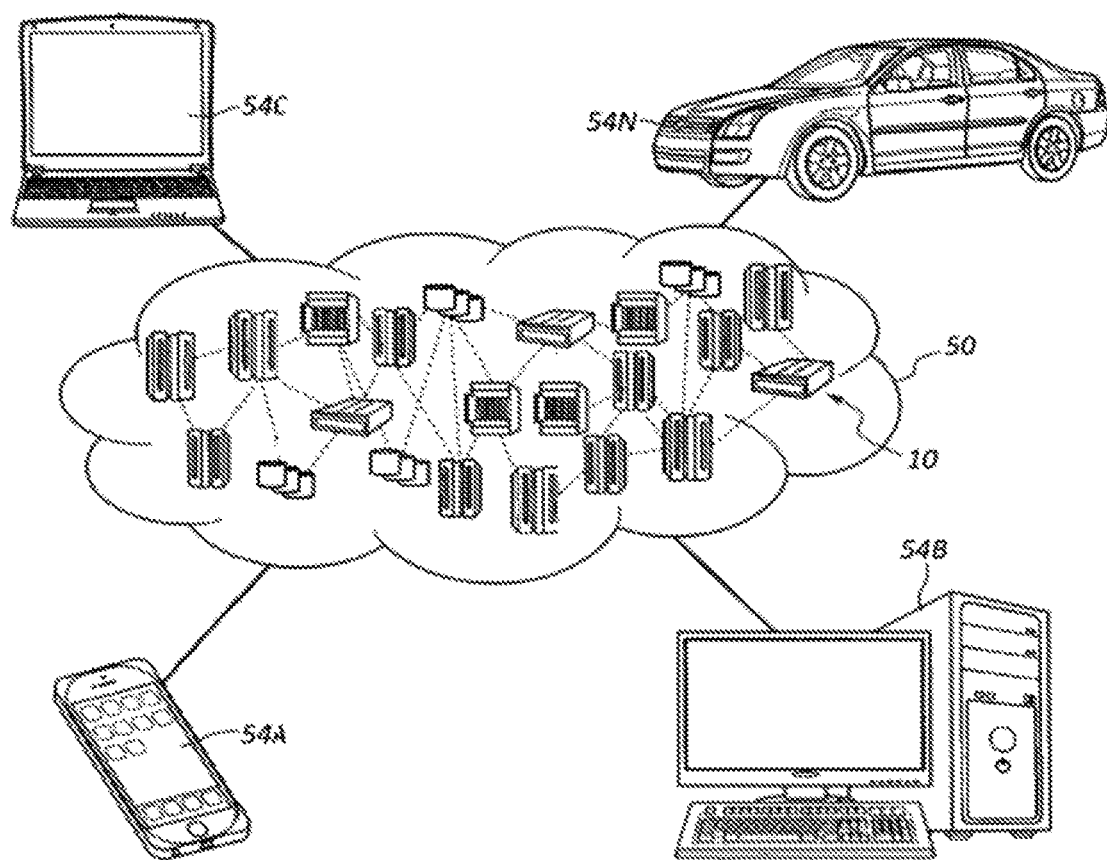
FIG. 5 depicts a cloud computing environment according to an embodiment of the present invention.
Figure 6:
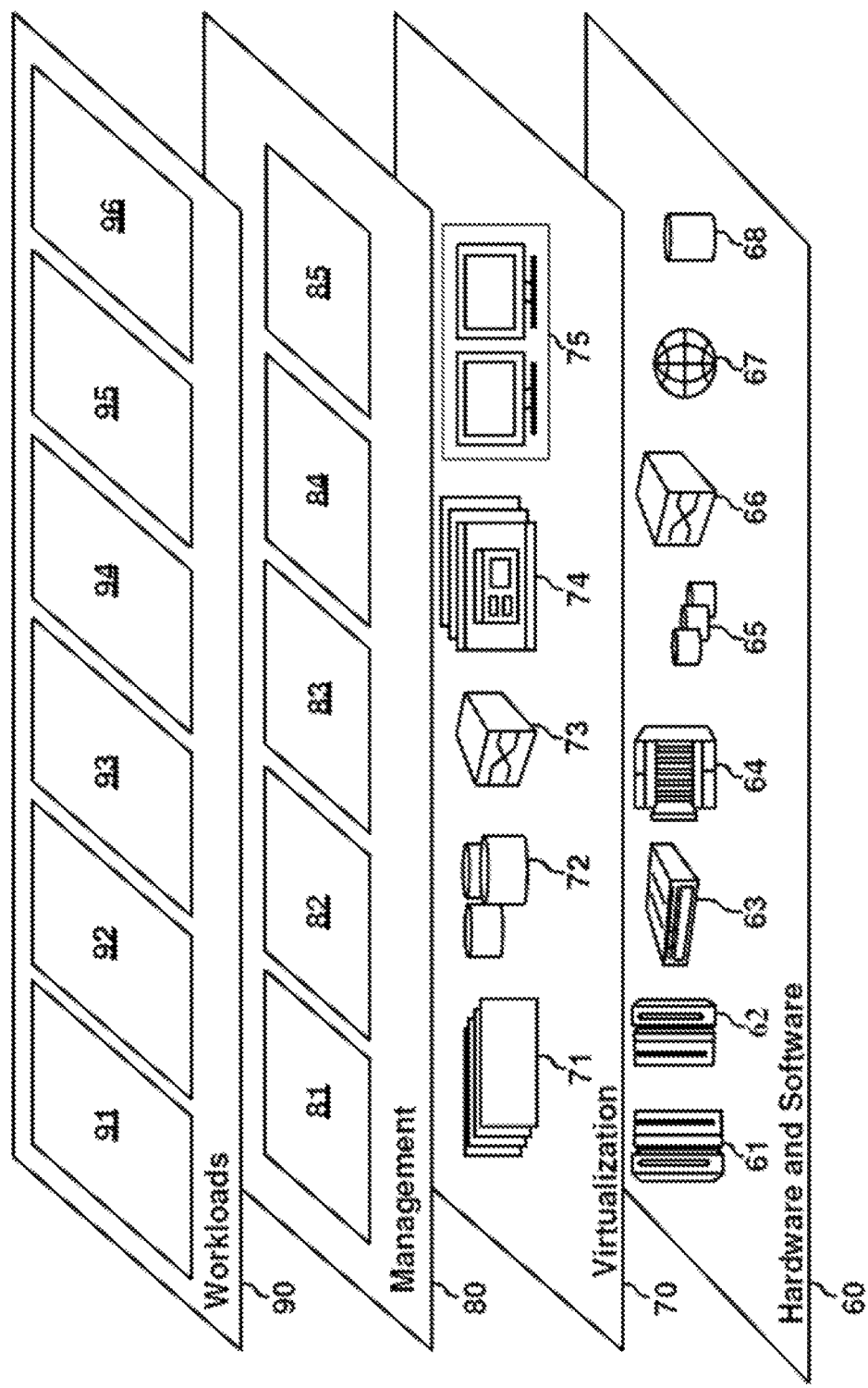
FIG. 6 depicts abstraction model layers according to an embodiment of the present invention.

FIGS. 4-6 depict various aspects of computing, including a computer system and cloud computing, in accordance with one or more aspects set forth herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 4, a schematic of an example of a computer system/cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system-executable instructions, such as program processes, being executed by a computer system. Generally, program processes may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program processes may be located in both local and remote computer system storage media including memory storage devices.

As shown in FIG. 4, computer system 12 in cloud computing node 10 is shown in the form of a general-purpose computing device. The components of computer system 12 may include, but are not limited to, one or more processors 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program processes that are configured to carry out the functions of embodiments of the invention.

One or more program 40, having a set (at least one) of program processes 42, may be stored in memory 28 by way of example, and not limitation, as well as an operating system, one or more application programs, other program processes, and program data. Each of the operating system, one or more application programs, other program processes, and program data or some combination thereof, may include an implementation of the intelligent marketing engine 110 of FIG. 1. Program processes 42, as in the intelligent marketing engine 110, the group determination process 120, and the cognitive content process 130, of FIG. 1, respectively, generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processors, external disk drive arrays, RAID systems, tape drives, and data archival storage systems, etc.

Referring now to FIG. 5, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing components for the checkout operation optimizer 96, as described herein. The processing components 96 can be understood as one or more program 40 described in FIG. 4.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

There is set forth herein, for example: A1. A computer implemented method for intelligent marketing, comprising: detecting, by one or more processor, a location event for a location within a venue as generated by a patron; determining a group of the patron and a relationship of the group; selecting an optimal marketing collateral for the patron based on the group and the relationship from the determining; and communicating the optimal marketing collateral from the selecting to the patron such that the patron may utilize the optimal marketing collateral. A2. The computer implemented method of A1, the detecting comprising: receiving data indicating a movement of the patron associated with the location, the movement corresponding to the location event, wherein the location event is associated with at least one marketing collateral. A3. The computer implemented method of A2, the determining comprising: ascertaining that the patron is in a group responsive to discovering that the patron is in proximity of the group; searching relationship data of the patron for members of the group; and identifying the relationship of the group based on the relationship data of the patron. A4. The computer implemented method of A3, the determining comprising: ascertaining that no group of the patron is present when the patron generated the location event responsive to discovering that the patron does not have anybody nearby; and identifying the relationship of the group as a default. A5. The computer implemented method of A4, the selecting comprising: electing the optimal marketing collateral that is associated with respective relationships of the group of the patron, wherein the default is associated with a default marketing collateral of the location, and the respective relationships are associated with a relationship marketing collateral for the location. A6. The computer implemented method of A1, the selecting further comprising: retrieving at least one cognitive factor relevant to the patron as well as the location, wherein the at least one cognitive factor is selected from a purchase history of the patron with the group, weather, state of mind for the patron, state of mind for the group, date and time of the day, such that the patron is more likely to utilize the optimal marketing collateral in the venue. A7. The computer implemented method of A1, wherein the optimal marketing collateral is a notification to a mobile device of the patron selected from various promotions available from the location. B1. A computer program product comprising: a computer readable storage medium readable by one or more processor and storing instructions for execution by the one or more processor for performing a method for intelligent marketing, comprising: detecting, by the one or more processor, a location event for a location within a venue as generated by a patron; determining a group of the patron and a relationship of the group; selecting an optimal marketing collateral for the patron based on the group and the relationship from the determining; and communicating the optimal marketing collateral from the selecting to the patron such that the patron may utilize the optimal marketing collateral. B2. The computer program product of B1, the detecting comprising: receiving data indicating a movement of the patron associated with the location, the movement corresponding to the location event, wherein the location event is associated with at least one marketing collateral. B3. The computer program product of B2, the determining comprising: ascertaining that the patron is in a group responsive to discovering that the patron is in proximity of the group; searching relationship data of the patron for members of the group; and identifying the relationship of the group based on the relationship data of the patron. B4. The computer program product of B3, the determining comprising: ascertaining that no group of the patron is present when the patron generated the location event responsive to discovering that the patron does not have anybody nearby; and identifying the relationship of the group as a default. B5. The computer program product of B4, the selecting comprising: electing the optimal marketing collateral that is associated with respective relationships of the group of the patron, wherein the default is associated with a default marketing collateral of the location, and the respective relationships are associated with a relationship marketing collateral for the location. B6. The computer program product of B1, the selecting further comprising: retrieving at least one cognitive factor relevant to the patron as well as the location, wherein the at least one cognitive factor is selected from a purchase history of the patron with the group, weather, a state of mind for the patron, a state of mind for the group, date and time of the day, such that the patron is more likely to utilize the optimal marketing collateral in the venue. B7. The computer program product of B1, wherein the optimal marketing collateral is a notification to a mobile device of the patron selected from various promotions available from the location. C1. A system comprising: a memory; one or more processor in communication with memory; and program instructions executable by the one or more processor via the memory to perform a method for intelligent marketing, comprising: detecting, by the one or more processor, a location event for a location within a venue as generated by a patron; determining a group of the patron and a relationship of the group; selecting an optimal marketing collateral for the patron based on the group and the relationship from the determining; and communicating the optimal marketing collateral from the selecting to the patron such that the patron may utilize the optimal marketing collateral. C2. The system of C1, the detecting comprising: receiving data indicating a movement of the patron associated with the location, the movement corresponding to the location event, wherein the location event is associated with at least one marketing collateral. C3. The system of C2, the determining comprising: ascertaining that the patron is in a group responsive to discovering that the patron is in proximity of the group; searching relationship data of the patron for members of the group; and identifying the relationship of the group based on the relationship data of the patron. C4. The system of C3, the determining comprising: ascertaining that no group of the patron is present when the patron generated the location event responsive to discovering that the patron does not have anybody nearby; and identifying the relationship of the group as a default. C5. The system of C4, the selecting comprising: electing the optimal marketing collateral that is associated with respective relationships of the group of the patron, wherein the default is associated with a default marketing collateral of the location, and the respective relationships are associated with a relationship marketing collateral for the location. C6. The system of C1, wherein the optimal marketing collateral is a notification to a mobile device of the patron selected from various promotions available from the location.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

What is claimed is:

1. A computer implemented method, comprising:
   detecting a location event for a location within a venue as generated by a patron, wherein the patron carries a mobile device, wherein the location event specifies a movement of the patron in relation with the location including one or more zone associated with respective products available from the venue, and wherein the location event is associated with at least one marketing collateral for one of products in a zone identified as the location;
   determining that the patron is in a group as accompanying one or more person having a relationship with the patron in the venue based on movements generated by the patron and a rest of the group, based on respective location monitoring devices employed in the venue, and a purchase pattern of the patron that is distinctive based on a type of the relationship between the patron and the rest of the group based on dynamic data mining on purchase history of the patron;
   selecting an optimal marketing collateral for the patron from the at least one marketing collateral associated with the location event, based on the group and the relationship between the patron and the rest of the group from the determining; and
   sending the optimal marketing collateral from the selecting to the mobile device of the patron such that the patron utilizes the optimal marketing collateral at the location of the venue.

2. The computer implemented method of claim 1, wherein the determining comprises ascertaining that the group initially includes only the patron based on that the patron does not share a travel pattern with other location monitoring devices in the venue; and identifying the relationship of the group.

3. The computer implemented method of claim 1, wherein the selecting comprises retrieving at least one cognitive factor relevant to the patron as well as the location, wherein the at least one cognitive factor is based on a purchase history of the patron in the group such that the patron is more likely to purchase a product promoted by the optimal marketing collateral in the location of the venue.

4. The computer implemented method of claim 1, wherein the selecting comprises retrieving at least one cognitive factor relevant to the patron as well as the location, wherein the at least one cognitive factor is based on a purchase history of the patron in the group.

5. The computer implemented method of claim 1, wherein the determining comprises ascertaining that the group initially includes only the patron based on that the patron does not share a travel pattern, wherein the selecting comprises retrieving at least one cognitive factor relevant to the patron as well as the location.

6. The computer implemented method of claim 1, wherein the determining comprises ascertaining that the group initially includes only the patron based on that the patron does not share a travel pattern; and identifying the relationship of the group; wherein the selecting comprises retrieving at least one cognitive factor relevant to the patron as well as the location, wherein the at least one cognitive factor is based on a purchase history of the patron in the group.

7. The computer implemented method of claim 1, the detecting comprising: receiving, from the mobile device by way of one of the location monitoring devices in the venue, data indicating the movement of the patron corresponding to the location event, wherein the location event is selected from the group consisting of an entry to the location, an exit from the location, and a duration of stay in the location, wherein the location further includes an outdoor area of the venue.

8. The computer implemented method of claim 1, the determining further comprising: ascertaining that the patron is in the group, responsive to subsequently discovering that the patron is in proximity of the rest of the group, and that the patron and the rest of the group share a travel pattern in the venue, based on similar location events as generated by the respective location monitoring devices on the patron and the rest of the group in the venue; searching relationship data of the patron for members of the rest of the group, wherein the relationship data is based on dynamic data mining selected from the group consisting of: contact directory data stored in the mobile device of the patron; and social network relationship data; and identifying the relationship of the group based on the relationship data of the patron.

9. The computer implemented method of claim 1, the selecting further comprising: electing the optimal marketing collateral for the product that is most likely to be purchased by the patron while being with the rest of the group of respective relationships to the patron, wherein a default relationship is associated with a default marketing collateral of the location, indicating that the patron is at the venue as an individual, and the respective relationships are associated with a relationship marketing collateral for the location.

10. The computer implemented method of claim 1, wherein the selecting comprises retrieving at least one cognitive factor relevant to the patron as well as the location, wherein the at least one cognitive factor is selected from the group consisting of the purchase history of the patron with the group, weather, state of mind for the patron, state of mind for the group, and date and time of the day.

11. The computer implemented method of claim 1, wherein the optimal marketing collateral is selected from the group consisting of a notification to the mobile device of the patron including a promotion for the product that the patron is most likely to purchase in the presence of the group, and an email message to the patron informing the promotion.

12. A computer program product comprising:
    a storage medium readable by one or more processing circuit and storing instructions for execution by one or more processor for performing a method comprising:
       detecting a location event for a location within a venue as generated by a patron, wherein the patron carries a mobile device, wherein the location event specifies a movement of the patron in relation with the location including one or more zone associated with respective products available from the venue, and wherein the location event is associated with at least one marketing collateral for one of products in a zone identified as the location;
       determining that the patron is in a group as accompanying one or more person having a relationship with the patron in the venue based on movements generated by the patron and a rest of the group, based on respective location monitoring devices employed in the venue, and a purchase pattern of the patron that is distinctive based on a type of the relationship between the patron and the rest of the group based on dynamic data mining on purchase history of the patron;
       selecting an optimal marketing collateral for the patron from the at least one marketing collateral associated with the location event, based on the group and the relationship between the patron and the rest of the group from the determining; and sending the optimal marketing collateral from the selecting to the mobile device of the patron such that the patron utilizes the optimal marketing collateral at the location of the venue.

13. A system comprising:

a memory;

one or more processor in communication with the memory; and program instructions executable by the one or more processor via the memory to perform a method comprising:

detecting a location event for a location within a venue as generated by a patron, wherein the patron carries a mobile device, wherein the location event specifies a movement of the patron in relation with the location including one or more zone associated with respective products available from the venue, and wherein the location event is associated with at least one marketing collateral for one of products in a zone identified as the location;

determining that the patron is in a group as accompanying one or more person having a relationship with the patron in the venue based on movements generated by the patron and a rest of the group, based on respective location monitoring devices employed in the venue, and a purchase pattern of the patron that is distinctive based on a type of the relationship between the patron and the rest of the group based on dynamic data mining on purchase history of the patron;

selecting an optimal marketing collateral for the patron from the at least one marketing collateral associated with the location event, based on the group and the relationship between the patron and the rest of the group from the determining; and sending the optimal marketing collateral from the selecting to the mobile device of the patron such that the patron utilizes the optimal marketing collateral at the location of the venue.

14. The system of claim 13, wherein the determining comprises ascertaining that the group initially includes only the patron based on that the patron does not share a travel pattern with other location monitoring devices in the venue; and identifying the relationship of the group.

15. The system of claim 13, wherein the selecting comprises retrieving at least one cognitive factor relevant to the patron as well as the location, wherein the at least one cognitive factor is based on a purchase history of the patron in the group such that the patron is more likely to purchase a product promoted by the optimal marketing collateral in the location of the venue.

16. The system of claim 13, wherein the selecting comprises retrieving at least one cognitive factor relevant to the patron as well as the location, wherein the at least one cognitive factor is based on a purchase history of the patron in the group.

17. The system of claim 13, wherein the determining comprises ascertaining that the group initially includes only the patron based on that the patron does not share a travel pattern, wherein the selecting comprises retrieving at least one cognitive factor relevant to the patron as well as the location.

18. The system of claim 13, wherein the determining comprises ascertaining that the group initially includes only the patron based on that the patron does not share a travel pattern; and identifying the relationship of the group; wherein the selecting comprises retrieving at least one cognitive factor relevant to the patron as well as the location, wherein the at least one cognitive factor is based on a purchase history of the patron in the group.

19. The system of claim 13, wherein the selecting comprises retrieving at least one cognitive factor relevant to the patron as well as the location, wherein the at least one cognitive factor comprises each of the purchase history of the patron with the group, weather, state of mind for the patron, state of mind for the group, and date and time of the day.

20. The system of claim 13, wherein the optimal marketing collateral is selected from the group consisting of a notification to the mobile device of the patron including a promotion for the product that the patron is most likely to purchase in the presence of the group, and an email message to the patron informing the promotion.

* * * * *